United States Patent
Sheridan

(10) Patent No.: US 11,053,811 B2
(45) Date of Patent: Jul. 6, 2021

(54) ROLLER BEARINGS FOR HIGH RATIO GEARED TURBOFAN ENGINE

(71) Applicant: Raytheon Technologies Corporation, Farmington, CT (US)

(72) Inventor: William G. Sheridan, Southington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 51 days.

(21) Appl. No.: 16/663,498

(22) Filed: Oct. 25, 2019

(65) Prior Publication Data

US 2020/0056498 A1 Feb. 20, 2020

Related U.S. Application Data

(63) Continuation of application No. 15/152,832, filed on May 12, 2016, now Pat. No. 10,458,270.
(Continued)

(51) Int. Cl.
*F01D 15/12* (2006.01)
*F02K 3/06* (2006.01)
(Continued)

(52) U.S. Cl.
CPC ............ *F01D 15/12* (2013.01); *F01D 25/16* (2013.01); *F02K 3/06* (2013.01); *F16H 57/082* (2013.01);
(Continued)

(58) Field of Classification Search
CPC ........ F01D 15/12; F01D 25/16; F16H 57/082; F16H 2057/085; F16H 1/28; F02K 3/06; F05D 2240/50; F05D 2260/40311
See application file for complete search history.

(56) References Cited

U.S. PATENT DOCUMENTS 2,258,792 A   4/1941  New
2,936,655 A   5/1960  Peterson et al.
(Continued)

FOREIGN PATENT DOCUMENTS

EP   0791383   8/1997
EP   1142850   10/2001
(Continued)

OTHER PUBLICATIONS

Honeywell LF507. Jane's Aero-engines, Aero-engines—Turbofan. Feb. 9, 2012.
(Continued)

*Primary Examiner* — Eldon T Brockman
(74) *Attorney, Agent, or Firm* — Carlson, Gaskey & Olds, P.C.

(57) ABSTRACT

A gear system for a geared turbofan engine is disclosed. The gear system includes a sun gear driven by a low spool shaft. The sun gear defines a sun gear diameter. A rotating carrier drives a fan. The carrier defines an outer carrier diameter and an inner carrier diameter. A non-rotating ring gear is also included. The ring gear defines a ring gear diameter and the ring gear diameter is smaller than the outer carrier diameter. A set of planet gears are mounted on corresponding rolling element bearing assemblies. Each roller element bearing assembly is supported within the carrier within a space defined between the carrier outer diameter and the carrier inner diameter. Each of the sun gear, ring gear and planet gears are substantially centered along a gearbox centerline transverse to an engine longitudinal axis and the gear system provides a speed reduction ratio between an input to the sun gear and an output from the carrier between 3:1 and 5:1. A method of creating a gear system for a geared turbofan engine and a geared turbofan system are also disclosed.

18 Claims, 4 Drawing Sheets

Related U.S. Application Data

(60) Provisional application No. 62/183,384, filed on Jun. 23, 2015.

(51) Int. Cl.
*F01D 25/16* (2006.01)
*F16H 57/08* (2006.01)
*F16H 1/28* (2006.01)

(52) U.S. Cl.
CPC .... *F05D 2220/323* (2013.01); *F05D 2240/50* (2013.01); *F05D 2260/40311* (2013.01); *F16H 1/28* (2013.01); *F16H 2057/085* (2013.01)

(56) References Cited

U.S. PATENT DOCUMENTS

| | | |
|---|---|---|
| 3,021,731 A | 2/1962 | Stoeckicht |
| 3,194,487 A | 7/1965 | Tyler et al. |
| 3,287,906 A | 11/1966 | McCormick |
| 3,352,178 A | 11/1967 | Lindgren et al. |
| 3,412,560 A | 11/1968 | Gaubatz |
| 3,664,612 A | 5/1972 | Skidmore et al. |
| 3,747,343 A | 7/1973 | Rosen |
| 3,754,484 A | 8/1973 | Roberts |
| 3,765,623 A | 10/1973 | Donelson et al. |
| 3,820,719 A | 6/1974 | Clark |
| 3,843,277 A | 10/1974 | Ehrich |
| 3,892,358 A | 7/1975 | Gisslen |
| 3,932,058 A | 1/1976 | Harner et al. |
| 3,935,558 A | 1/1976 | Miller et al. |
| 3,988,889 A | 11/1976 | Chamay et al. |
| 4,130,872 A | 12/1978 | Harloff |
| 4,220,171 A | 9/1980 | Ruehr |
| 4,240,250 A | 12/1980 | Harris |
| 4,284,174 A | 8/1981 | Salvana et al. |
| 4,289,360 A | 9/1981 | Zirin |
| 4,478,551 A | 10/1984 | Honeycutt, Jr. et al. |
| 4,649,114 A | 3/1987 | Miltenburger et al. |
| 4,696,156 A | 9/1987 | Burr et al. |
| 4,722,357 A | 2/1988 | Wynosky |
| 4,979,362 A | 12/1990 | Vershure, Jr. |
| 5,058,617 A | 10/1991 | Stockman et al. |
| 5,102,379 A | 4/1992 | Pagluica et al. |
| 5,141,400 A | 8/1992 | Murphy et al. |
| 5,317,877 A | 6/1994 | Stuart |
| 5,361,580 A | 11/1994 | Ciokajlo et al. |
| 5,433,674 A | 7/1995 | Sheridan et al. |
| 5,447,411 A | 9/1995 | Curley et al. |
| 5,466,198 A | 11/1995 | McKibbin et al. |
| 5,524,847 A | 6/1996 | Brodell et al. |
| 5,634,767 A | 6/1997 | Dawson |
| 5,677,060 A | 10/1997 | Terentieva et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 5,985,470 A | 11/1999 | Spitsberg et al. |
| 6,223,616 B1 | 5/2001 | Sheridan |
| 6,315,815 B1 | 11/2001 | Spadaccini et al. |
| 6,318,070 B1 | 11/2001 | Rey et al. |
| 6,364,805 B1 | 4/2002 | Stegherr |
| 6,387,456 B1 | 5/2002 | Eaton, Jr. et al. |
| 6,517,341 B1 | 2/2003 | Brun et al. |
| 6,607,165 B1 | 8/2003 | Manteiga et al. |
| 6,709,492 B1 | 3/2004 | Spadaccini et al. |
| 6,814,541 B2 | 11/2004 | Evans et al. |
| 6,883,303 B1 | 4/2005 | Seda |
| 7,021,042 B2 | 4/2006 | Law |
| 7,219,490 B2 | 1/2007 | Dev |
| 7,328,580 B2 | 2/2008 | Lee et al. |
| 7,374,403 B2 | 5/2008 | Decker et al. |
| 7,591,754 B2 | 9/2009 | Duong et al. |
| 7,632,064 B2 | 12/2009 | Somanath |
| 7,662,059 B2 | 2/2010 | McCune |
| 7,806,651 B2 | 10/2010 | Kennepohl et al. |
| 7,824,305 B2 | 11/2010 | Duong et al. |
| 7,828,682 B2 | 11/2010 | Smook |
| 7,926,260 B2 | 4/2011 | Sheridan et al. |
| 7,997,868 B1 | 8/2011 | Liang et al. |
| 8,205,432 B2 | 6/2012 | Sheridan |
| 8,262,535 B2 | 9/2012 | Klingels |
| 8,398,525 B2 | 3/2013 | Matsuoka et al. |
| 8,562,284 B2 | 10/2013 | Bradbrook |
| 8,678,743 B1 | 3/2014 | Sheridan et al. |
| 8,827,859 B2 | 9/2014 | Fox |
| 8,973,266 B2 * | 3/2015 | Jiang ............. F02C 7/277 29/893.1 |
| 9,121,368 B2 | 9/2015 | Gallagher et al. |
| 9,194,432 B2 | 11/2015 | Ashmore et al. |
| 9,243,647 B2 | 1/2016 | Evans |
| 10,415,429 B2 * | 9/2019 | Hasting ............ F16H 57/08 |
| 10,458,270 B2 * | 10/2019 | Sheridan .......... F01D 15/12 |
| 2006/0228206 A1 | 10/2006 | Decker et al. |
| 2008/0003096 A1 | 1/2008 | Kohli et al. |
| 2008/0116009 A1 | 5/2008 | Sheridan et al. |
| 2008/0317588 A1 | 12/2008 | Grabowski et al. |
| 2009/0056343 A1 | 3/2009 | Suciu et al. |
| 2009/0314881 A1 | 12/2009 | Suciu et al. |
| 2010/0105516 A1 | 4/2010 | Sheridan et al. |
| 2010/0148396 A1 | 6/2010 | Xie et al. |
| 2010/0212281 A1 | 8/2010 | Sheridan |
| 2010/0218483 A1 | 9/2010 | Smith |
| 2010/0331139 A1 | 12/2010 | McCune |
| 2011/0159797 A1 | 6/2011 | Beltman et al. |
| 2011/0293423 A1 | 12/2011 | Bunker et al. |
| 2012/0124964 A1 | 5/2012 | Hasel et al. |
| 2012/0309583 A1 | 12/2012 | Ai et al. |
| 2013/0087413 A1 | 4/2013 | Carter et al. |
| 2014/0130356 A1 * | 5/2014 | Jiang ............. F16H 57/023 29/893.1 |
| 2015/0267744 A1 | 9/2015 | Gallimore et al. |
| 2017/0089219 A1 * | 3/2017 | Hasting ............ F16H 1/28 |
| 2019/0309688 A1 * | 10/2019 | Stretton ........... F02K 3/06 |

FOREIGN PATENT DOCUMENTS

| | | |
|---|---|---|
| GB | 1516041 | 6/1978 |
| GB | 2041090 | 9/1980 |
| GB | 2426792 | 12/2006 |
| WO | 2007038674 | 4/2007 |
| WO | 2015/012923 A2 | 1/2015 |

OTHER PUBLICATIONS

Honeywell TFE731. Jane's Aero-engines, Aero-engines—Turbofan. Jul. 18, 2012.

NASA Conference Publication. Quiet, powered-lift propulsion. Cleveland, Ohio. Nov. 14-15, 1978. pp. 1-420.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8). Start p. 32.

Hendricks, E.S. and Tong, M.T. (2012). Performance and weight estimates for an advanced open rotor engine. NASA/TM-2012-217710. pp. 1-13.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

Zalud, T. (1998). Gears put a new spin on turbofan performance. Machine Design, 70(20), p. 104.

Kurzke, J. (2008). Preliminary Design, Aero-engine design: From state of the art turbofans towards innovative architectures. pp. 1-72.

Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.

Han, J., Dutta, S., and Ekkad, S.V. (2000). Gas turbine heat transfer and cooling technology. New York, NY: Taylor & Francis. pp. 1-25, 129-157, and 160-249.

(56) References Cited

OTHER PUBLICATIONS

Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30. pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., MacMartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003.. p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-367-C9-373.
Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28 (9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76 (1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Leckie, F.A. and Dal Bello, D.J. (2009). Strength and stiffness of engineering systems. Mechanical Engineering Series. Springer. pp. 1-3.
El-Sayad, A.F. (2008). Aircraft propulsion and gas turbine engines. Boca Raton, FL: CRC Press. pp. 215-219 and 855-860.
Bunker, R.S. (2005). A review of shaped hole turbine film-cooling technology. Journal of Heat Transfer vol. 127. Apr. 2005. pp. 441-453.
Anderson, R.D. (1985). Advanced Propfan Engine Technology (APET) definition study, single and counter-rotation gearbox/pitch change mechanism design. NASA CR-168115. Jul. 1, 1985. pp. 1-289.
Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.
Gliebe, P.R., Ho, P.Y., and Mani, R. (1995). UHB engine fan and broadband noise reduction study. NASA CR-198357. Jun. 1995. pp. 1-48.
Holcombe, V. (2003). Aero-Propulsion Technology (APT) task V low noise ADP engine definition study. NASA CR-2003-212521. Oct. 1, 2003. pp. 1-73.
Sutliff, D. (2005). Rotating rake turbofan duct mode measurement system. NASA TM-2005-213828. Oct. 1, 2005. pp. 1-34.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.
NASA Conference Publication. (1978). CTOL transport technology. NASA-CP-2036-PT-1. Jun. 1, 1978. pp. 1-531.
Kandebo, S.W. (1998). Geared-Turbofan engine design targets cost, complexity. Aviation Week & Space Technology, 148(8). p. 34-5.
Davis, D.G.M. (1973). Variable-pitch fans: Progress in Britain. Flight International. Apr. 19, 1973. pp. 615-617.

(56) References Cited

OTHER PUBLICATIONS

Levintan, R.M. (1975). Q-Fan demonstrator engine. Journal of Aircraft. vol. 12( 8). Aug. 1975. pp. 658-663.
Technical Report. (1975). Quiet Clean Short-haul Experimental Engine (QCSEE) UTW fan preliminary design. NASA-CR-134842. Feb. 1, 1975. pp. 1-98.
Aerospace Information Report. (2008). Advanced ducted propulsor in-flight thrust determination. SAE International AIR5450. Aug. 2008. p. 1-392.
Daggett, D.L., Brown, S.T., and Kawai, R.T. (2003). Ultra-efficient engine diameter study. NASA/CR-2003-212309. May 2003. pp. 1-52.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009. Orlando, Florida. pp. 145-153.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers,108(8), 65-67.
Faghri, A. (1995). Heat pipe and science technology. Washington, D.C.: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed.) (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Bearing calculation, Extract from the Railway technical handbook, vol. 1, chapter 5, p. 106 to 121, 2012.

(56) References Cited

OTHER PUBLICATIONS

European Search Report for EP Application No. 16175203.5 dated Nov. 17, 2016.
Winn, A. (Ed). (1990). Wide Chord Fan Club. Flight International, 4217(137). May 23-29, 1990. pp. 34-38.
Parker, R.G. and Lin, J. (2001). Modeling, modal properties, and mesh stiffness variation instabilities of planetary gears. Prepared for NASA. NASA/CR-2001-210939. May 2001. pp. 1-111.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.
Product Brochure. Garrett TFE731. Allied Signal. Copyright 1987. pp. 1-24.
Honeywell Learjet 31 and 35136 TFE731-2 to 2C Engine Upgrade Program. Sep. 2005. pp. 1-4.
Honeywell Sabreliner 65 TFE731-3 to -3D Engine Upgrade Program. Oct. 2005. pp. 1-4.
U.S. Department of Transportation: Federal Aviation Administration Type Certificate Data Sheet No. E6WE. Dated: May 9, 2000. p. 1-9.
Kurzke, J. (2012). GasTurb 12: Design and off-design performance of gas turbines. Retrieved from: https://www.scribd.com/document/153900429/GasTurb-12.
Ahmad, F. and Mizramoghadam, A.V. (1999). Single v. two stage high pressure turbine design of modern aero engines. ASME. Presented at the International Gas Turbine & Aeroengine Congress & Exhibition. Indianapolis, Indiana. Jun. 7-10, 1999. pp. 1-9.
Riegler, C., and Bichlmaier, C. (2007). The geared turbofan technology—Opportunities, challenges and readiness status. Porceedings CEAS. Sep. 10-13, 2007. Berlin, Germany. pp. 1-12.
About GasTurb. Retrieved Jun. 26, 2018 from: http://gasturb.de/about-gasturb.html.
Kurzke, J. (2001). GasTurb 9: A program to calculate design and off-design performance of gas turbines. Retrieved from: https://www.scribd.com/document/92384867/GasTurb9Manual.
Tummers, B. (2006). DataThief III. Retreived from: https://datathief.org/DatathiefManual.pdf pp. 1-52.
Manual. Student's Guide to Learning SolidWorks Software. Dassault Systemes—SolidWorks Corporation. pp. 1-156.
Macisaac, B. and Langston, R. (2011). Gas turbine propulsion systems. Chichester, West Sussex: John Wiley & Sons, Ltd. pp. 260-265.
Datasheet. CFM56-5B for the Airbus A320ceo family and CFM56-7B for the Boeing 737 family. https://www.cfmaeroengines.com/.
Turner, M. G., Norris, A., and Veres, J.P. (2004). High-fidelity three-dimensional simulation of the GE90. NASA/TM-2004-212981. pp. 1-18.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Amezketa, M., Iriarte, X., Ros, J., and Pintor, J. (2009). Dynamic model of a helical gear pair with backlash and angleOvarying mesh stiffness. Multibody Dynamics 2009, ECCOMAS Thematic Conference. 2009. pp. 1-36.
Singh, A. (2005). Application of a system level model to study the planetary load sharing behavior. Jounal of Mechanical Design. vol. 127. May 2005. pp. 469-476.
Smith-Boyd, L. and Pike, J. (1986). Expansion of epicyclic gear dynamic analysis program. Prepared for NASA. NASA CR-179563. Aug. 1986. pp. 1-98.

Wikipedia. Torsion spring. Retreived Jun. 29, 2018 from: https://en.wikipedia.org/wiki/Torsion_spring.
AGMA Standard (2006). Design manual for enclosed epicyclic gear drives. Alexandria, VA: American Gear Manufacturers Association. pp. 1-104.
AGMA Standard (1997). Design and selection of components for enclosed gear drives. lexandria, VA: American Gear Manufacturers Association. pp. 1-48.
Daly, M. Ed. (2007). Jane's Aero-Engine. Issue Twenty-three. Mar. 2008. p. 707-12.
AGMA Standard (1999). Flexible couplings- Mass elastic properties and other characteristics. Alexandria, VA: American Gear Manufacturers Association. pp. 1-46.
Wikipedia. Stiffness. Retreived Jun. 28, 2018 from: https://en.wikipedia.org/wiki/Stiffness.
Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.
Hill, P.G., Peterson, C.R. (1965). Mechanics and thermodynamics of propulsion. Addison-Wesley Publishing Company, Inc. pp. 307-308.
Hill, P.G., Peterson, C.R. (1992). Mechanics and thermodynamics of propulsion, 2nd Edition. Addison-Wesley Publishing Company, Inc. pp. 400-406.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.
Gray, D.E. and Gardner, W.B. (1983). Energy efficient engine program technology benefit/cost study—vol. 2. NASA CR-174766. Oct. 1983. pp. 1-118.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. AIAA-93/0598. 31st Aerospace Sciences Meeting. Reno, NV. Jan. 11-14, 1993. pp. 1-30.
Howe, D.C., and Wynosky, T.A. (1985). Energy efficient engine program advanced turbofan nacelle definition study. NASA-CR-174942. May 1985. pp. 1-60.
Howe, D.C., and Wynosky, T.A. (1985). Energy efficient engine program advanced turbofan nacelle definition study. NASA-CR-174942. May 1985. University of Washington dated Dec. 13, 1990. pp. 1-14.
Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.
Mattingly, J.D. (1996). Elements of gas turbine propulsion. New York, New York: McGraw-Hill, Inc. pp. 1-18, 60-62, 223-234, 462-479, 517-520, 757-767, and 862-864.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Middleton, P. (1971). 614: VFW's jet feederliner. Flight International, Nov. 4, 1971. p. 725, 729-732.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-31.

(56) References Cited

OTHER PUBLICATIONS

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.

Baker, R.W. (2000). Membrane technology and applications. New York, NY: McGraw-Hill. pp. 87-153.

Cheryan, M. (1998). Ultrafiltration and microfiltration handbook. Lancaster, PA: Tecnomic Publishing Company, Inc. pp. 171-236.

Seader, J.D. and Henley, E.J. (1998). Separation process principles. New York, NY: John Wiley & Sons, Inc. pp. 722-6 and 764-71.

Spadaccini, L.J., and Huang, H. (2002). On-line fuel deoxygenation for coke suppression. ASME, Jun. 2002. pp. 1-7.

Darrah, S. (1987). Jet fuel deoxygenation. Interim Report for Period Mar. 1987-Jul. 1988. pp. 1-22.

Bucknell, R.L. (1973). Influence of fuels and lubricants on turbine engine design and performance, fuel and lubricant analyses. Final Technical Report, Mar. 1971-Mar. 1973. pp. 1-252.

Hazlett, R.N. (1991). Thermal oxidation stability of aviation turbine fuels. Philadelphia, PA: ASTM. pp. 1-163.

Taylor, W.F. (1974). Deposit formation from deoxygenated hydrocarbons. I. General features. Ind. Eng. Chem., Prod. Res. Develop., vol. 13(2). 1974. pp. 133-138.

Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.

Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.

Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.

Hemighaus, G., Boval, T., Bacha, J., Barnes, F., Franklin, M., Gibbs, L., . . . Morris, J. (2007). Aviation fuels: Technical review. Chevron Products Company. pp. 1-94. Retrieved from: https://www.cgabusinessdesk.com/document/aviation_tech_review.pdf.

Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.

Edwards, T. and Zabarnick, S. (1993). Supercritical fuel deposition mechanisms. Ind. Eng. Chem. Res. vol. 32. 1993. pp. 3117-3122.

Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.

Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.

Matsumoto, T., Toshiro, U., Kishida, A., Tsutomu, F., Maruyama, I., and Akashi, M. (1996). Novel functional polymers: Poly(dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.

Technical Data. Teflon. WS Hampshire Inc. Retrieved from: http://catalog.wshampshire.com/Asset/psg_teflon_pffe.pdf.

Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.

Edkins, D.P., Hirschkron, R., and Lee, R. (1972). TF34 turbofan quiet engine study. Final Report prepared for NASA. NASA-CR-120914. Jan. 1, 1972. pp. 1-99.

Waters, M.N. and Schairer, E.T. (1977). Analysis of turbofan propulsion system weight and dimension. NASA Technical Memorandum. Jan. 1977. pp. 1-65.

Meyer, A.G. (1988). Transmission development of TEXTRON Lycoming's geared fan engine. Technical Paper. Oct. 1988. pp. 1-12.

Dudley, D.W., Ed. (1962). Gear handbook. New York, NY: McGraw-Hill. pp. 14-17 (TOC, Preface, and Index).

Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.

Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.

Gates, D. Bombardier flies at higher market. Seattle Times. Jul. 13, 2008. pp. C6.

Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.

Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.

Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.

McCune, M.E. (1993). Initial test results of 40,000 horsepower fan drive gear system for advanced ducted propulsion systems. AIAA 29th Joint Conference and Exhibit. Jun. 28-30, 1993. pp. 1-10.

Wright, G.H. and Russell, J.G. (1990). The M.45SD-02 variable pitch geared fan engine demonstrator test and evaluation experience. Aeronautical Journal., vol. 84(836). Sep. 1980. pp. 268-277.

Drago, R.J. (1974). Heavy-lift helicopter brings up drive ideas. Power Transmission Design. Mar. 1987. pp. 1-15.

Krantz, T.L. (1990). Experimental and analytical evaluation of efficiency of helicopter planetary stage. NASA Technical Paper. Nov. 1990. pp. 1-19.

Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.

Thulin, R.D., Howe, D.C., and Singer, I.D. (1982). Energy efficient engine: High pressure turbine detailed design report. Prepared for NASA. NASA CR-165608. Received Aug. 9, 1984. pp. 1-178.

Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.

Gray, D.E. (1978). Energy efficient engine preliminary design and integration studies. Prepared for NASA. NASA CR-135396. Nov. 1978. pp. 1-366.

Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.

McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.

Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.

(56) References Cited

OTHER PUBLICATIONS

Datasheet. CF6-80C2 high-bypass turbofan engines. Retreived from https://geaviation.com/sites/default/files/datasheet-CF6-80C2.pdf.

Salemme, C.T. and Murphy, G.C. (1979). Metal spar/superhybrid shell composite fan blades. Prepared for NASA. NASA-CR-159594. Aug. 1979. pp. 1-127.

"Press release. The GE90 engine. Retrieved from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old".

Datasheet. Genx™ high bypass turbofan engines. Retreived from: https://www.geaviation.com/sites/default/files/datasheet-genx.pdf.

\* cited by examiner

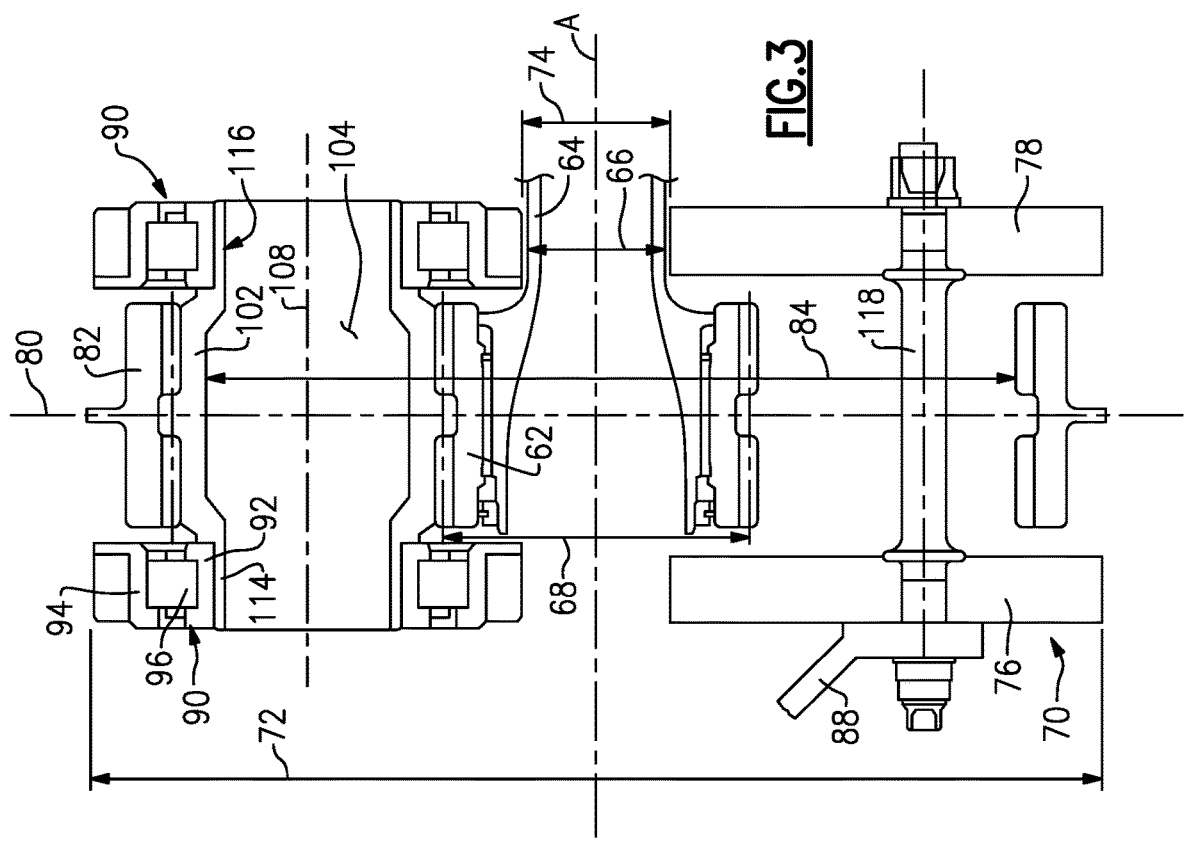
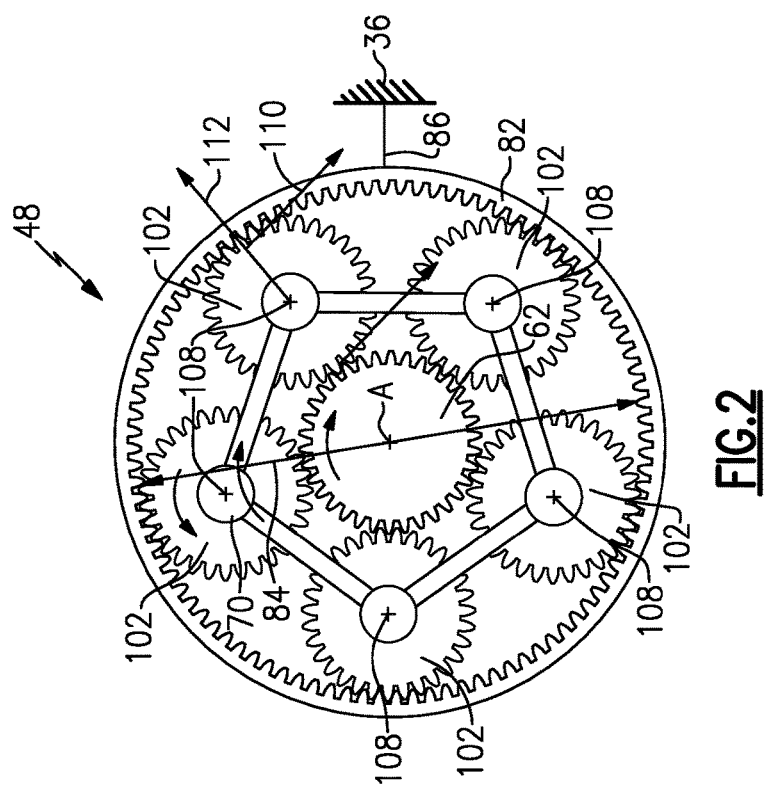

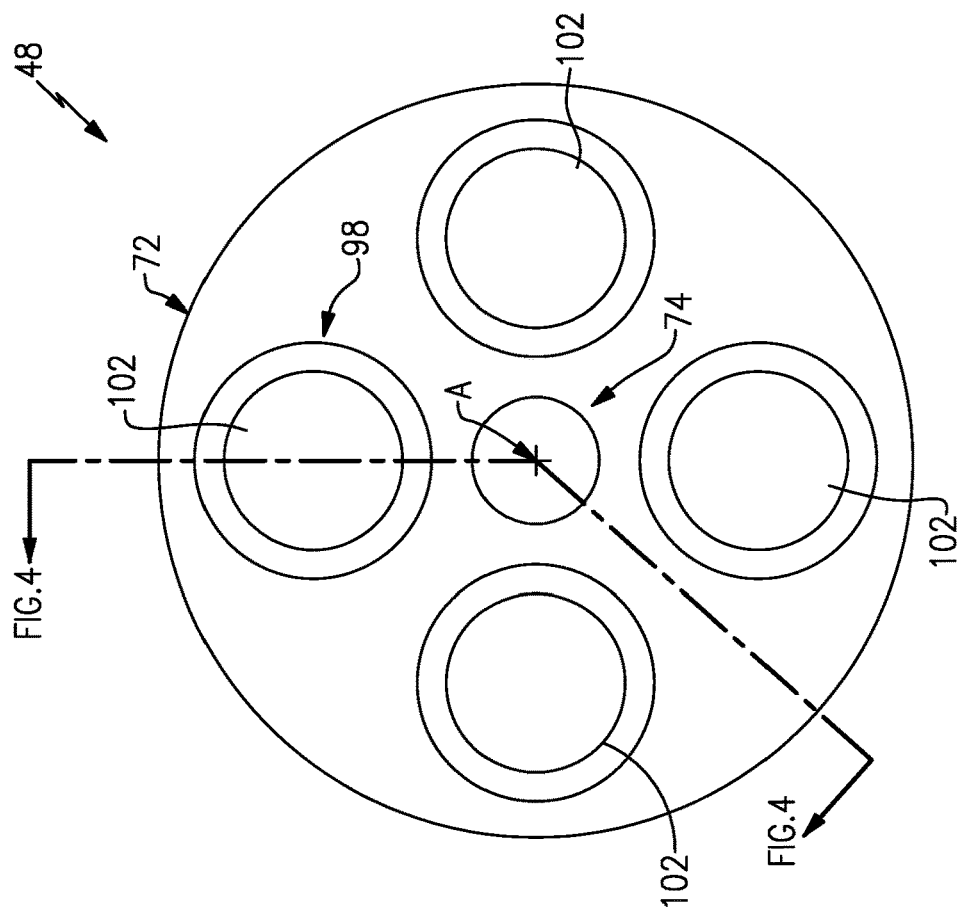
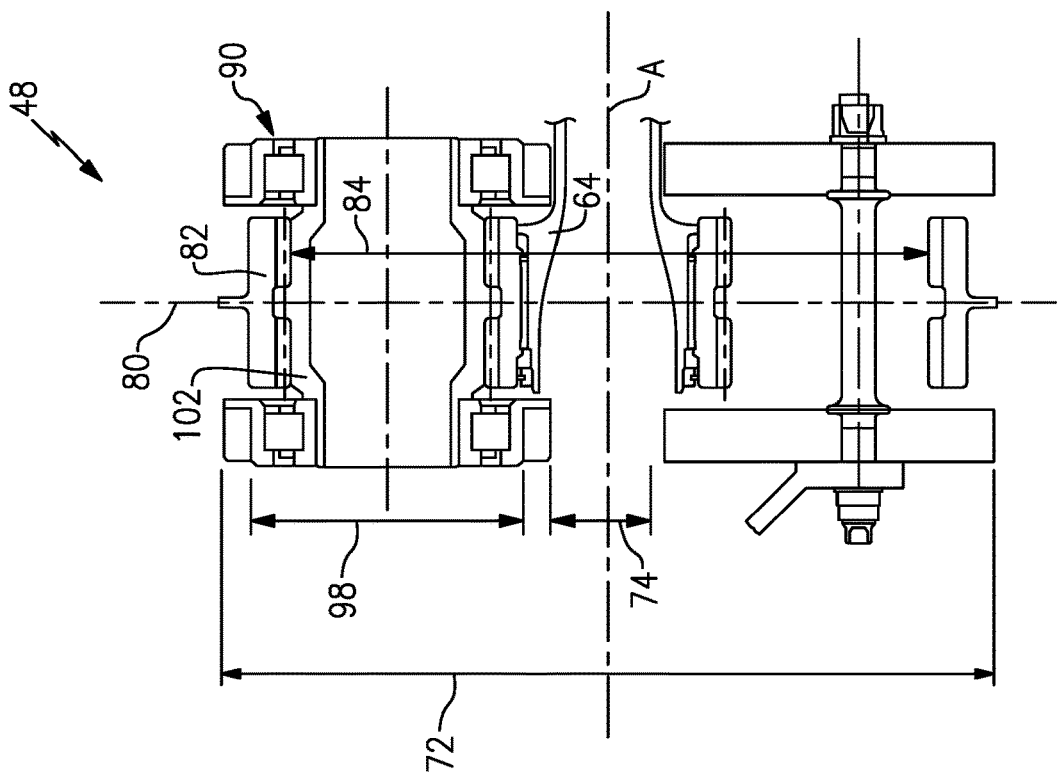

ROLLER BEARINGS FOR HIGH RATIO GEARED TURBOFAN ENGINE

CROSS REFERENCE TO RELATED APPLICATION

This application is a continuation of U.S. patent application Ser. No. 15/152,832 filed May 12, 2016 that claims priority to U.S. Provisional Application No. 62/183,384 filed Jun. 23, 2015.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Although geared architectures have improved propulsive efficiency, turbine engine manufacturers continue to seek further improvements to engine performance including improvements to thermal, transfer and propulsive efficiencies.

SUMMARY

In a featured embodiment, a gear system for a geared turbofan engine in which the gear system includes a sun gear driven by a low spool shaft. The sun gear defines a sun gear diameter. A rotating carrier drives a fan. The carrier defines an outer carrier diameter and an inner carrier diameter. A non-rotating ring gear is also included. The ring gear defines a ring gear diameter and the ring gear diameter is smaller than the outer carrier diameter. A set of planet gears are mounted on corresponding rolling element bearing assemblies. Each roller element bearing assembly is supported within the carrier within a space defined between the carrier outer diameter and the carrier inner diameter. Each of the sun gear, ring gear and planet gears are substantially centered along a gearbox centerline transverse to an engine longitudinal axis and the gear system provides a speed reduction ratio between an input to the sun gear and an output from the carrier between 3:1 and 5:1.

In another embodiment according to the previous embodiment, the set of planet gears includes between 3 and 5 planet gears, inclusive.

In another embodiment according to any of the previous embodiments, an outer periphery of the roller element bearings extends past the ring gear diameter.

In another embodiment according to any of the previous embodiments, the carrier includes a forward portion attached to an aft portion with the set of planet gears supported between the forward portion and the aft portion.

In another embodiment according to any of the previous embodiments, the ring gear diameter includes a pitch diameter.

In another embodiment according to any of the previous embodiments, the sun gear diameter is greater than carrier inner diameter.

In another embodiment according to any of the previous embodiments, the rolling element bearing assemblies include one of a roller, ball, tapered roller, and spherical bearing.

In another embodiment according to any of the previous embodiments, the rolling element bearing assemblies include multiple rows or rolling element bearings.

In another featured embodiment, a method of creating a gear system for a geared turbofan engine, the method includes configuring a carrier to include an outer diameter and an inner diameter about a gearbox centerline transverse to an engine longitudinal axis. A sun gear is configured to be supported on an input shaft. The input shaft includes a diameter less than the carrier inner diameter and the sun gear includes a sun gear pitch diameter greater than the carrier inner diameter. A ring gear is configured to include a ring gear pitch diameter. A set of planet gears is configured for assembly into the carrier. Each of the sun gear, the ring gear and the set of planet gears are configured to be centered along the gearbox centerline. At least one rolling element bearing assembly is configured to include a bearing outer diameter that fits within a space between the carrier outer diameter and the carrier inner diameter. A bearing life of the at least one rolling element bearing assembly is confirmed based upon the bearing outer diameter being within a desired range. The set of planet gears is configured to include between 3 and 5 gears, inclusive, responsive to the size of the bearing outer diameter.

In another embodiment according to the previous embodiment, includes configuring the ring gear pitch diameter to be less than the carrier outer diameter.

In another embodiment according to any of the previous embodiments, includes selecting the number of planet gears within the set of planet gears to provide the greatest number of planet gears with a rolling element bearing assembly within the desired range.

In another embodiment according to any of the previous embodiments, includes configuring the carrier to include a forward portion attached to an aft portion and supporting the set of planet gears between the forward portion and the aft portion.

In another embodiment according to any of the previous embodiments, includes supporting a rolling element bearing assembly within each of the forward portion and the aft portion.

In another embodiment according to any of the previous embodiments, includes configuring the rolling element bearing assemblies to include at least one of a roller, ball, tapered roller, and spherical bearing.

In a featured embodiment, a geared turbofan engine includes a fan section rotatable about an engine longitudinal axis, a turbine section, and a gear system driven by the turbine section. The gear system includes a sun gear driven by a low spool shaft. The sun gear defines a sun gear diameter. A rotating carrier drives the fan section. The carrier defines an outer carrier diameter and an inner carrier diameter. A non-rotating ring gear is also included. The ring gear defines a ring gear diameter and the ring gear diameter is smaller than the carrier outer diameter. A set of planet gears are mounted on corresponding rolling element bearing assemblies. Each of the roller element bearing assemblies are being supported within the carrier within a space defined between the carrier outer diameter and the carrier inner diameter. Each of the sun gear, ring gear and planet gears are substantially centered along a gearbox centerline transverse to an engine longitudinal axis and the gear system provides a speed reduction ratio between an input to the sun gear and an output from the carrier between 3:1 and 5:1.

In another embodiment according to the previous embodiment, the set of planet gears includes between 3 and 5 planet gears, inclusive.

In another embodiment according to any of the previous embodiments, an outer periphery of each of the roller element bearing assemblies extends past the ring gear diameter.

In another embodiment according to any of the previous embodiments, the carrier includes a forward portion attached to an aft portion with the set of planet gears supported between the forward portion and the aft portion.

In another embodiment according to any of the previous embodiments, the rolling element bearing assemblies include one of a roller, ball, tapered roller, and spherical bearing.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 schematically shows an example gear system for a geared turbofan engine.

FIG. 3 is a cross-section of an example gear system embodiment.

FIG. 4 is the cross-section of the example gear system embodiment illustrating example features for sizing rolling element bearing assemblies.

FIG. 5 is a schematic view of the gear system further illustrating features for sizing rolling element bearing assemblies.

DETAILED DESCRIPTION

Figure 1:
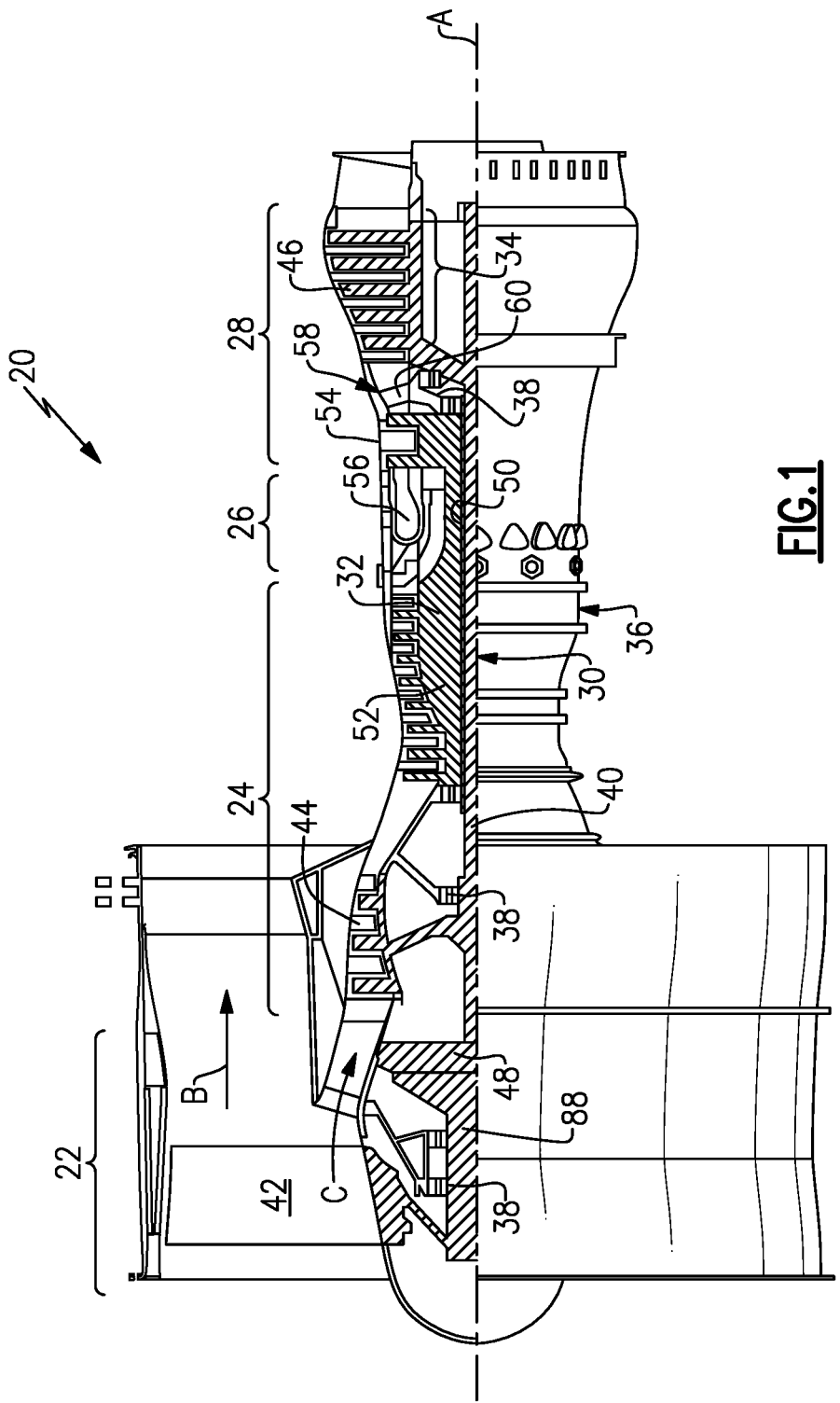
FIG. 1 schematically shows an embodiment of a geared turbofan engine.

FIG. 1 schematically illustrates an example geared turbofan engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high energy exhaust gas stream that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a gear system 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high energy exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of stages in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example gear system 48 is an epicyclical gear train, such as a planetary gear system, star gear system or other known gear system, with a gear reduction ratio of greater than about 2.3. In another example embodiment the gear system provides a speed reduction ratio greater than about 3:1. In yet another example embodiment the gear system 48 provides a speed reduction ratio between about 3:1 and about 5:1.

In one disclosed embodiment, the geared turbofan engine 20 includes a bypass ratio greater than about ten (10:1) and the fan diameter is significantly larger than an outer diameter of the low pressure compressor 44. It should be understood, however, that the above parameters are only exemplary of one embodiment of a geared turbofan engine including a gear system and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blades alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°R)]^{0.5}$. The "Low corrected fan tip speed", as disclosed herein according to one non-limiting embodiment, is less than about 1150 ft/second. The fan tip speed is understood by those skilled in the art to be measured at engine operating conditions associated with takeoff of an aircraft.

The example geared turbofan engine 20 includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example geared turbofan engine 20 with increased power transfer efficiency.

Referring to FIGS. 2 and 3 with continued reference to FIG. 1, an example gear system 48 includes a sun gear 62 that is driven about the engine axis A by an input shaft 64. The input shaft 64 is driven by the inner shaft 40 that, in this example, is driven by the low pressure turbine 46. The sun gear 62 drives a plurality of planet gears 102 supported by a carrier 70. The planet gears 102 rotate within a ring gear 82 that is attached by fixed support 86 to the static structure 36 of the engine 20 such that the ring gear 82 does not rotate.

The example carrier 70 rotates about the engine axis A and drives a fan shaft 88 that drives the fan section 22. Each of the sun gear 62, planet gears 102 and the ring gear 82 are centered about a gear system centerline 80. The centerline 80 is disposed transverse to the engine axis A and defines a single stage gear system 48.

The carrier 70 includes a forward portion 76 attached to an aft portion 78 by fastener assemblies 118 (only one shown in FIG. 3). The aft portion 78 of the carrier 70 includes an inner diameter 74 disposed about the engine axis A. The input shaft 64 includes an outer diameter 66 that is less than the inner diameter 74 of the carrier 70. The sun gear 62 includes a pitch diameter 68 that is larger than the inner diameter 74 of the carrier.

The carrier 70 includes an outer diameter 72 that is larger than a pitch diameter 84 of the ring gear 82. Each of the planet gears 102 are supported for rotation within the carrier about a corresponding axis 108. Each axis 108 is parallel to the engine axis A. The example planet gears 102 are hollow and include an inner cavity 104. Each planet gear 102 includes a first end 114 and a second end 116 that are supported by a bearing assembly 90. The bearing assembly 90 includes a rolling element 96 supported between an inner race 92 and an outer race 94. The bearing assembly 90 is in turn supported within the carrier 70.

The carrier 70 rotates about the engine axis A and therefore experiences increased loads during engine operation as compared to gear systems with a fixed carrier. The bearing assemblies 90 therefore experience increased loading. During engine operation the rotating carrier 70, and thereby each of the bearing assemblies 90 encounter gear loads from the planet gear 102 as shown by arrows 110 and also centrifugal load of the rotating gear mass shown schematically as arrow 112. The gear load 110 and centrifugal load 112 are added by vector summation and must be accommodated by the bearing assemblies 90. The load that the bearing assemblies 90 must accommodate is therefore a total load P that is the sum of the centrifugal load indicated by arrow 112 plus the gear tangential loads indicated by arrows 110.

The bearing assemblies 90 include rolling elements 96 that are supported within the carrier 70. The larger the rolling element 96, the more load capacity, and therefore better performance and durability. The example rolling element 96 can be of any rolling element configuration known including roller, ball, tapered roller, spherical as well as other known configurations. Moreover, although the example bearing assembly 90 is shown as a single row of rolling elements 94, multiple rows of rolling elements are also within the contemplation of this disclosure.

Increasing the size of the rolling elements 94 however requires additional space that in turn reduces space for other features of the gear system 48 such as the number of planet gears 102. The number of planet gears 102 may vary between 3 and 5, inclusive. As appreciated, the more planet gears 102, the less load that is incurred on any one planet gear 102 and corresponding bearing assembly 90. Accordingly, the size of the bearing assemblies 90 is balanced against increases in load on each planet gear 102 for the same space defined for the gear system 48. Additionally, more or larger planet gears 102 can increase the overall weight that in turn increases loads on the bearing assemblies 90. The example disclosed gear system 48 therefore includes features enabling efficient configuration and operation within a set defined design space.

Referring to FIGS. 4 and 5, with continued reference to FIGS. 2 and 3, FIGS. 4 and 5 illustrate features of the gear system 48 that are configured to determine the number of planet gears 102 balanced against the size of the bearing assemblies 90 within a set and defined design space. The parameters utilized to configure the size of the bearing assemblies 90 include the outer diameter 72 of the carrier 70. In this example the outer diameter 72 corresponds with the largest outer diameter for each of the forward portion 76 and the aft portion 78. The inner diameter 74 of the carrier 70 is also considered. The outer diameter 72 and the inner diameter 74 define the design space within which the planet gears 102 and bearing assemblies 90 are to operate. A pitch diameter 84 for the ring gear 82 is indicated in FIG. 4 to illustrate that the outer diameter 72 of the carrier 70 may exceed the pitch diameter 84 of the ring gear 82.

The size of the bearing assemblies 90 must fit within the annular space defined between the inner diameter 74 and the outer diameter 72. The bearing assemblies 90 must also provide an operational life that provides the desired durability for the loads encountered during operation. Bearing life is a calculation known to those skilled in the art and provides a measure of the bearing life at given loads. In one example, bearing life L is calculated utilizing the below equation:

$$L=(C/P)^{3.333}$$

where C is the bearing capacity; and
P is the total load (centrifugal load and gear load).

The bearing capacity C is value determined for the specific rolling element and represents a rated capacity based on material, size, quality level and other mechanical characteristics specific to the rolling element. The bearing capacity C is a value known and understood by one skilled in the art. Larger values for C correspond with larger bearing size and larger load capacity. However as C increases, and thereby the corresponding size of the rolling element 96 increases, the fewer planet gears 102 that can be utilized within the defined space between the outer diameter 72 and the inner diameter 74. Fewer planet gears 102 also result in larger tangential loads required to carry torque generated and input into the gear system 48.

Accordingly, if three (3) planet gears 102 are utilized, the torsional gear load from the sun gear 62 is split three ways. If four (4) planet gears 102 are utilized than the load is split across four (4) planet gears 102. If five (5) planet gears 102 are utilized than the load is split across five (5) planet gears 102.

Figure 6:
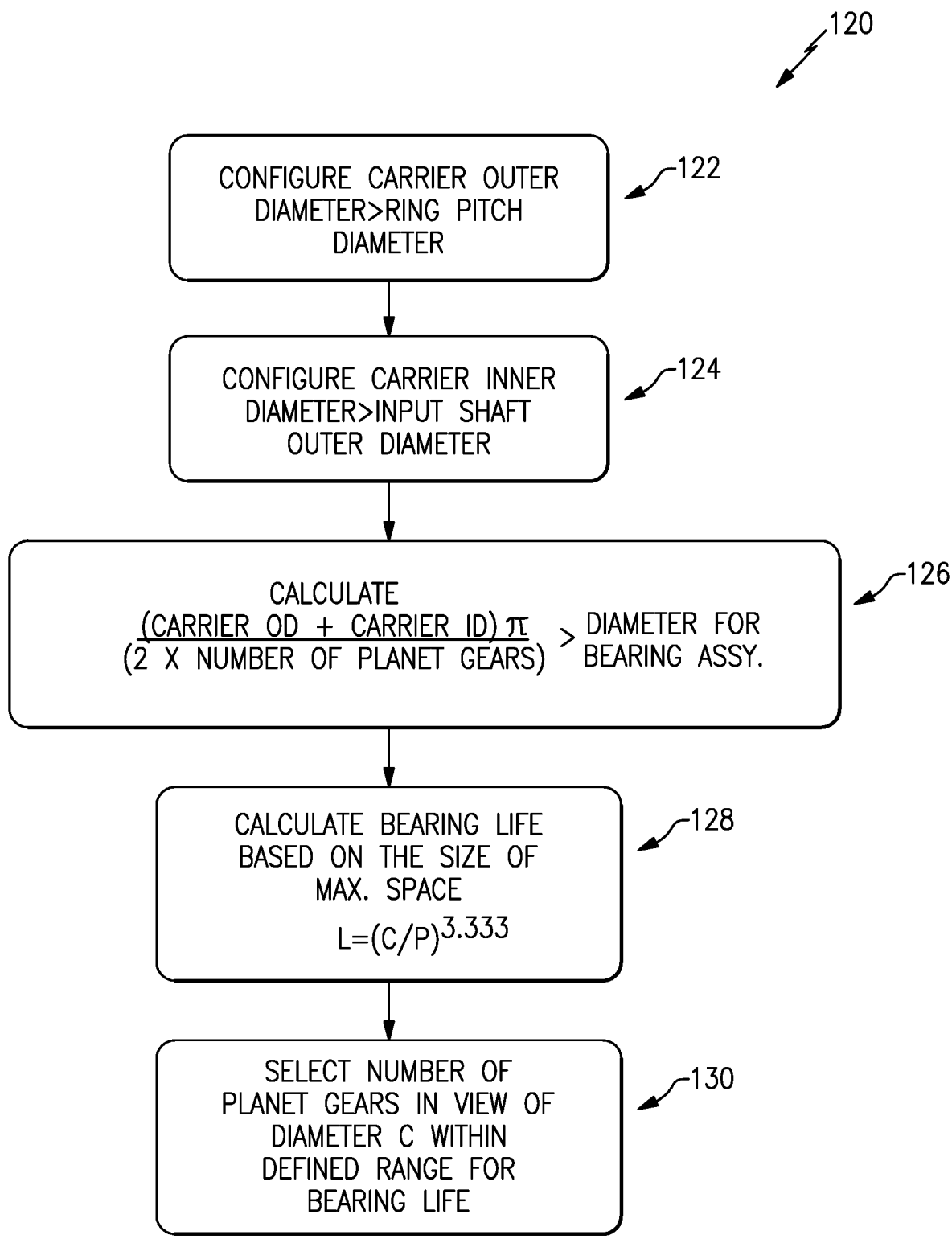
FIG. 6 is chart illustrating an example method for configuring a gear system including rolling element bearing assemblies.

Referring to FIG. 6, with continued reference to FIGS. 4 and 5, a disclosed process of assembling and configuring the example gear system 48 is schematically shown at 120 and is initiated by first defining the design space. The design space is that space between the inner diameter 74 of the carrier 70 and the outer diameter 72 of the carrier 70. In the disclosed example, the first step is to maximize the carrier outer diameter 72 so it is as large as possible outside the ring gear pitch diameter 84 as is indicated at 122. The carrier inner diameter 74 is than minimized to the smallest diameter possible that will allow the input shaft 64 to extend through the aft portion 78 and still be strong enough to deliver torque to the sun gear 68. The circumference of the average diameter between the outer diameter 72 and the inner diameter 74 is utilized along with the number of planet gears 102 to determine the maximum space remaining for the diameter of the rolling element 96 as is indicated at 126.

Accordingly, the maximum possible size for the rolling element 96 of the bearing assembly 90 is reflected in the below equation.

$$\frac{(\text{Carrier }OD+\text{Carrier }ID)\pi}{(2\times\text{number of planets})} > \text{Diameter for rolling element}$$

The number of planet gears 102 is also dependent on the desired speed reduction ratio. In one disclosed example embodiment the speed reduction ratio is between about 3:1 and about 5:1. This speed reduction ratio range enables a maximum number of planet gears to be no more than five (5) and requires at least three (3) planet gears. Therefore, the step of calculating the possible diameter of the bearing assembly as indicated at 126 includes determining the possible diameter for at least three (3) planet gears 102 and no more than five (5) planet gears 102.

The diameter for the rolling element 96 is therefore made as large as possible between the outer diameter 72 and the inner diameter 74 to fit three (3) planet gears 102 and then reduced in size to fit four (4) and five (5) planet gears 102.

Once the size of the rolling element 96 is determined for each possible number of planet gears 102, life calculations are made for each configuration as indicated at 128. The configuration with bearing life within a desired range of life according to the bearing life calculation is initially selected as the configuration for the gear system 48. Note that "C" utilized in the life calculation is a value that accounts for the diameter of the rolling element bearing and also represents the rated Capacity of the bearing. The Capacity of the bearing is based on size, stresses and material of the selected rolling bearing element. In general, the larger diameter bearing will have a higher capacity "C" for bearings of the same material, construction and quality level.

Many different diameters of the rolling element 96 may provide the desired bearing life expectancy for the loads placed on the gear system 48. However, the designs space, and/or the size of the rolling element is minimized to enable more options in the number of planet gears 102. The design space determination indicated at 126 may be repeated along with the bearing life calculations indicated at 128 to define a smallest bearing space that still provides the desired operational life. Accordingly, the design space is selecting using the largest bearing that will fit between the outer and inner diameters 72 and 74 with the fewest planets. Bearing life is then calculated as indicated at 128. The diameter and/or space for the rolling element is then reduced until an additional planet gear 102 can be utilized to determine if the bearing life still provides an acceptable operational life.

Once a bearing configuration is determined that fits within the defined design space and that meets the desired bearing life requirements, the configuration of the gear system can be finalized by selecting the number of planet gears 102 that fit within the desired life expectancy ranges as indicated at 130.

Accordingly, the disclosed example gear system and configuration method enables assembly and operation that accommodates the increased loading and provides speed reduction within a desired range.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gear system for a geared turbofan engine, the gear system comprising:
a sun gear driven by a low spool shaft, the sun gear defining a sun gear diameter;
a rotating carrier that drives a fan, the carrier defining an outer carrier diameter and an inner carrier diameter;
a non-rotating ring gear, the ring gear defining a ring gear diameter, the ring gear diameter is smaller than the outer carrier diameter; and
a set of planet gears including 3, 4 or 5 planet gears; and rolling element bearing assemblies supporting each of the set of planet gears, each roller element bearing assembly is supported within the carrier within a space defined between the carrier outer diameter and the carrier inner diameter, wherein a diameter of each of the bearing elements of the roller element bearing assembly is less than a sum of the carrier outer diameter and the carrier inner diameter multiplied by $\pi$ and divided by twice the number of planet gears and wherein each of the sun gear, ring gear and planet gears are substantially centered along a gearbox centerline transverse to an engine longitudinal axis and the gear system provides a speed reduction ratio between an input to the sun gear and an output from the carrier.

2. The gear system as recited in claim 1, wherein the speed reduction ratio is between 3:1 and 5:1.

3. The gear system as recited in claim 1, wherein an outer periphery of the roller element bearings extends past the ring gear diameter.

4. The gear system as recited in claim 1, wherein carrier comprises a forward portion attached to an aft portion with the set of planet gears supported between the forward portion and the aft portion.

5. The gear system as recited in claim 1, wherein the ring gear diameter comprises a pitch diameter.

6. The gear system as recited in claim 1, wherein the sun gear diameter is greater than carrier inner diameter.

7. The gear system as recited in claim 1, wherein the rolling element bearing assemblies comprise one of a roller, ball, tapered roller, and spherical bearing.

8. The gear system as recited in claim 1, wherein the rolling element bearing assemblies comprise multiple rows or rolling element bearings.

9. A method of creating a gear system for a geared turbofan engine, the method comprising:
configuring a carrier to include an outer diameter and an inner diameter about a gearbox centerline transverse to an engine longitudinal axis;
configuring a sun gear to be supported on an input shaft, wherein the input shaft includes a diameter less than the carrier inner diameter and the sun gear includes a sun gear pitch diameter greater than the carrier inner diameter;
configuring a ring gear to include a ring gear pitch diameter;
configuring a set of planet gears for assembly into the carrier, wherein each of the sun gear, the ring gear and the set of planet gears are configured to be centered along the gearbox centerline;
configuring at least one rolling element bearing assembly to include a bearing outer diameter that is less than a sum of the carrier outer diameter and the carrier inner diameter multiplied by $\pi$ and divided by twice the number of planet gears;
confirming a bearing life of the at least one rolling element bearing assembly based upon the bearing outer diameter being within a desired range; and
configuring the set of planet gears to include between 3 and 5 gears, inclusive, responsive to the size of the bearing outer diameter.

10. The method as recited in claim 9, including configuring the ring gear pitch diameter to be less than the carrier outer diameter.

11. The method as recited in claim 9, including selecting the number of planet gears within the set of planet gears to provide the greatest number of planet gears with a rolling element bearing assembly within the desired range.

12. The method as recited in claim 9, including configuring the carrier to include a forward portion attached to an aft portion and supporting the set of planet gears between the forward portion and the aft portion.

13. The method as recited in claim 12, including supporting a rolling element bearing assembly within each of the forward portion and the aft portion.

14. The method as recited in claim 9, including configuring the rolling element bearing assemblies to include at least one of a roller, ball, tapered roller, and spherical bearing.

15. A geared turbofan engine comprising;
a fan section rotatable about an engine longitudinal axis;
a turbine section; and
a gear system driven by the turbine section, the gear system including:
a sun gear driven by a low spool shaft, the sun gear defining a sun gear diameter,
a rotating carrier for driving the fan section, the carrier defining an outer carrier diameter and an inner carrier diameter,
a non-rotating ring gear, the ring gear defining a ring gear diameter, the ring gear diameter is smaller than the carrier outer diameter, and
a set of planet gears including 3, 4 or 5 planet gears; and rolling element bearing assemblies supporting each of the set of planet gears, each of the roller element bearing assemblies being supported within the carrier within a space defined between the carrier outer diameter and the carrier inner diameter, wherein a diameter of each of the bearing elements of the roller element bearing assembly is less than a sum of the carrier outer diameter and the carrier inner diameter multiplied by $\pi$ and divided by twice the number of planet gears and each of the sun gear, ring gear and planet gears are substantially centered along a gearbox centerline transverse to an engine longitudinal axis and the gear system provides a speed reduction ratio between an input to the sun gear and an output from the carrier between 3:1 and 5:1.

16. The geared turbofan engine as recited in claim 15, wherein an outer periphery of each of the roller element bearing assemblies extends past the ring gear diameter.

17. The geared turbofan engine as recited in claim 15, wherein the carrier comprises a forward portion attached to an aft portion with the set of planet gears supported between the forward portion and the aft portion.

18. The geared turbofan system as recited in claim 15, wherein the rolling element bearing assemblies comprise one of a roller, ball, tapered roller, and spherical bearing.

* * * * *